United States Patent
Kollmann et al.

(10) Patent No.: US 10,421,443 B2
(45) Date of Patent: Sep. 24, 2019

(54) SOLENOID VALVE, IN PARTICULAR FOR SLIP-REGULATED MOTOR-VEHICLE BRAKE SYSTEMS

(71) Applicant: Continental Teves AG & Co. oHG, Frankfurt (DE)

(72) Inventors: Holger Kollmann, Rodgau (DE); Sigismund Jones, Neu-Anspach (DE); Christian Schulz, Riedstadt (DE); Christian Courth, Frankfurt (DE); André Schröder, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/618,219

(22) Filed: Jun. 9, 2017

(65) Prior Publication Data

US 2018/0056954 A1    Mar. 1, 2018

Related U.S. Application Data

(63) Continuation of application No. PCT/EP2015/077926, filed on Nov. 27, 2015.

(30) Foreign Application Priority Data

Dec. 9, 2014 (DE) .................. 10 2014 225 251

(51) Int. Cl.
*F16K 31/06* (2006.01)
*B60T 8/36* (2006.01)
(Continued)

(52) U.S. Cl.
CPC .............. *B60T 8/363* (2013.01); *F16K 1/385* (2013.01); *F16K 27/029* (2013.01); *F16K 31/0655* (2013.01); *F16K 31/0658* (2013.01)

(58) Field of Classification Search
CPC . B60T 8/363; F16K 1/385; F16K 1/42; F16K 1/425; F16K 31/658
(Continued)

(56) References Cited

U.S. PATENT DOCUMENTS 5,476,313 A * 12/1995 Lauer ...................... B60T 8/365
                                                       251/129.15
5,511,864 A *  4/1996 Reinartz ................. B60T 8/363
                                                       303/113.1
(Continued)

FOREIGN PATENT DOCUMENTS

CN      201096196 Y    8/2008
DE      10229789 A1    8/2003
(Continued)

OTHER PUBLICATIONS

International Search Report and Written Opinion dated Feb. 12, 2016 from corresponding International Patent Application No. PCT/EP2015/077926.
(Continued)

*Primary Examiner* — Matthew W Jellett

(57) ABSTRACT

A solenoid valve comprises a valve closing body, which can open or close a valve passage formed in a valve seat body which is pressed into a valve housing, and comprising a magnet armature acted upon by a restoring spring, arranged in a through-bore of the valve housing. In addition to a press-fit segment, the valve seat body has a clearance-fit segment along the outer jacket of the valve seat body. The clearance-fit segment has a reduced outside diameter in relation to the press-fit segment. The valve housing also has a tube segment, which deflects radially inward and which has a constant inside diameter that is reduced relative to the outside diameter of the press-fit segment. The tube segment
(Continued)

thus deflecting into the clearance-fit segment of the valve seat body because of the elasticity of the tube segment.

18 Claims, 2 Drawing Sheets

(51) Int. Cl.
*F16K 27/02* (2006.01)
*F16K 1/38* (2006.01)

(58) Field of Classification Search
USPC .............. 251/129.02, 129.15, 359, 360, 362; 303/119.2
See application file for complete search history.

(56) References Cited

U.S. PATENT DOCUMENTS

| | | | |
|---|---|---|---|
| 5,577,322 A * | 11/1996 | Ohshita | B60T 8/363 251/129.15 |
| 5,647,644 A | 7/1997 | Volz et al. | |
| 5,791,747 A * | 8/1998 | Sorensen | B60T 8/36 251/129.02 |
| 7,168,679 B2 * | 1/2007 | Shirase | B60T 8/363 251/129.02 |
| 9,163,746 B2 * | 10/2015 | Voss | F16K 31/0658 |

FOREIGN PATENT DOCUMENTS

| | | |
|---|---|---|
| DE | 102004030428 A1 | 1/2006 |
| DE | 102010062818 A1 | 6/2012 |
| JP | 2004360750 A | 12/2004 |
| JP | 2009092188 A | 4/2009 |
| KR | 1019960700167 | 8/1996 |
| KR | 20090037008 A | 4/2009 |
| WO | WO9951901 A1 | 10/1999 |
| WO | WO9966239 A1 | 12/1999 |
| WO | WO03014607 A1 | 2/2003 |
| WO | WO2015124484 A1 | 8/2015 |

OTHER PUBLICATIONS

German Search Report dated Aug. 21, 2015 for corresponding German Patent Application No. 10 2014 225 251.2.
China Office Action dated Jul. 27, 2018 for corresponding Chinese Patent Application No. 201580066747.X.
Korea Office Action dated Aug. 2, 2018 for corresponding Korean Patent Application No. 10-2017-7013767.

* cited by examiner

SOLENOID VALVE, IN PARTICULAR FOR SLIP-REGULATED MOTOR-VEHICLE BRAKE SYSTEMS

CROSS-REFERENCE TO RELATED APPLICATION

This application claims the benefit of PCT International application No. PCT/EP2015/077926, filed Nov. 27, 2015, which claims the benefit of German patent application No. 10 2014 225 251.2, filed Dec. 9, 2014, each of which are hereby incorporated by reference herein.

TECHNICAL FIELD

The invention relates to a solenoid valve, in particular for motor vehicle brake systems with wheel-slip control.

BACKGROUND

DE 10 2004 030 428 A1 has already disclosed a solenoid valve, comprising an armature for actuating a valve closing element, actuated in opposition to the action of a return spring, in a tubular valve housing, which comprises a fluid passage in a tubular valve seat element, which on energizing of the armature is closed by means of the tappet-shaped valve closing element, wherein the valve closing element extends inside a through-bore in the valve housing through the helical return spring, which is supported on an end face of the valve seat element formed in the area of the through-bore. The valve seat element is fixed in the valve housing by means of a press-fit and carries a filter element on its end face remote from the return spring.

However, that the valve closing element is subjected not only to the permanent action of the return spring but also to the action of the hydraulic pressure prevailing in the valve housing, which can lead to an inadmissible axial displacement of the valve seat element in the valve housing.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

A solenoid valve comprises a valve closing body, which can open or close a valve passage formed in a valve seat body which is pressed into a valve housing, and comprising a magnet armature acted upon by a restoring spring, arranged in a through-bore of the valve housing. In addition to a press-fit segment, the valve seat body has a clearance-fit segment along the outer jacket of the valve seat body. The clearance-fit segment has a reduced outside diameter in relation to the press-fit segment. The valve housing also has a tube segment, which deflects radially inward and which has a constant inside diameter that is reduced relative to the outside diameter of the press-fit segment. The tube segment thus deflecting into the clearance-fit segment of the valve seat body because of the elasticity of the tube segment.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
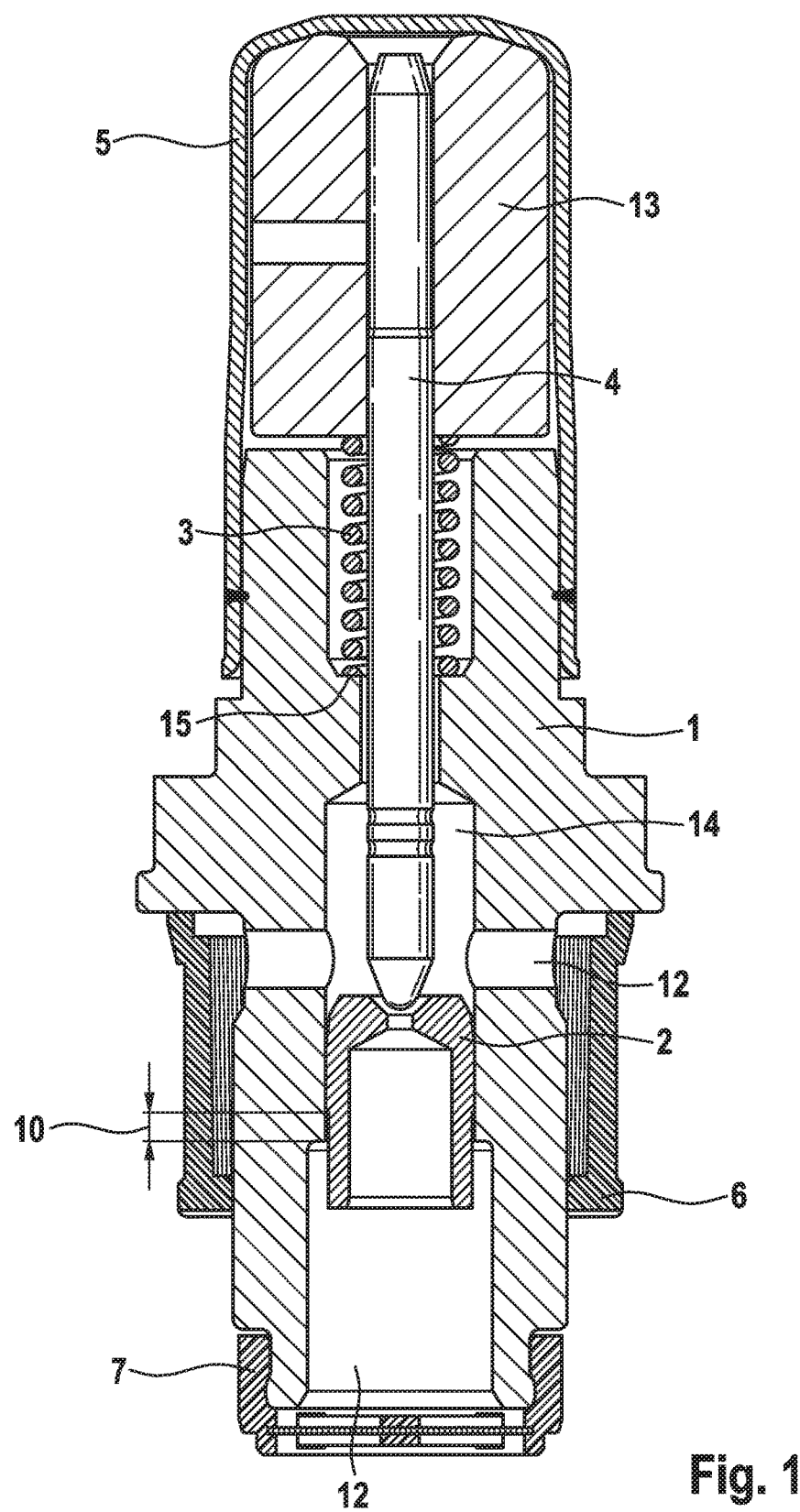
FIG. 1 shows a longitudinal section through a solenoid valve.

FIG. 1, in a considerably enlarged view, shows a longitudinal section through a solenoid valve, which is preferably used for motor vehicle brake systems with wheel-slip control. For actuating a tappet-shaped valve closing element 4 in a cap 5 mounted on a tubular valve housing 1, the solenoid valve comprises an armature 13, which acts in opposition to the action of a return spring 3 and which when energized by means of the valve closing element 4 closes a fluid passage in a valve seat element 2.

The valve closing element 2 extends inside a through-bore 14 in the valve housing 1 through the helical return spring 3 in the direction of the valve seat element 2, and is non-positively fixed in the valve housing 1. The return spring 3 is supported by a first spring end on an end face provided in the area of the through-bore 14, whilst the second end of the return spring 3, remote from the end face, bears on the armature 13.

An offset is defined in the form of a bore step 15, on which the return spring 3 is supported by the end remote from the armature 13, is provided in the through-bore 14. This relieves the valve seat element 2 of the permanently acting preloading force of the return spring 3.

In this exemplary embodiment the armature 13 is accommodated inside the austenitic cap 5 of sleeve-shaped design, which is welded to the thick-walled, tubular valve housing 1, which ensures a secure fastening in a valve locating bore of a valve mounting element (not shown).

The cap 5 can be manufactured by deep-drawing from thin sheet metal, whilst the profile of the tubular valve housing 1 may be produced by cold pressing or cold extrusion from a steel blank, which has a ferritic material grain structure to constitute the magnetic circuit.

Opening into the valve housing 1 on each side of the valve seat element 2 is a pressure connection 12, which is formed as a lateral port above the valve seat element 2 and as a vertical port below the valve seat element 2, wherein the tubular portion 10 accommodates a ring filter 6 in the area of the lateral port and a plate filter 7 in the area of the vertical port.

In the normal, electromagnetically unenergized valve position depicted, the valve closing element 4 remains at a distance from the valve seat element 2, exposing the fluid passage, so that an unimpeded hydraulic connection is ensured between the pressure connections 12 opening into the valve housing above and below valve seat element 2 respectively. In the electromagnetically energized position, on the other hand, the valve closing element 4 closes the fluid passage in the valve seat element 2, there being a need to ensure that the valve seat element 2 still remains in its pressed-in position in the valve housing 1.

Figure 2:
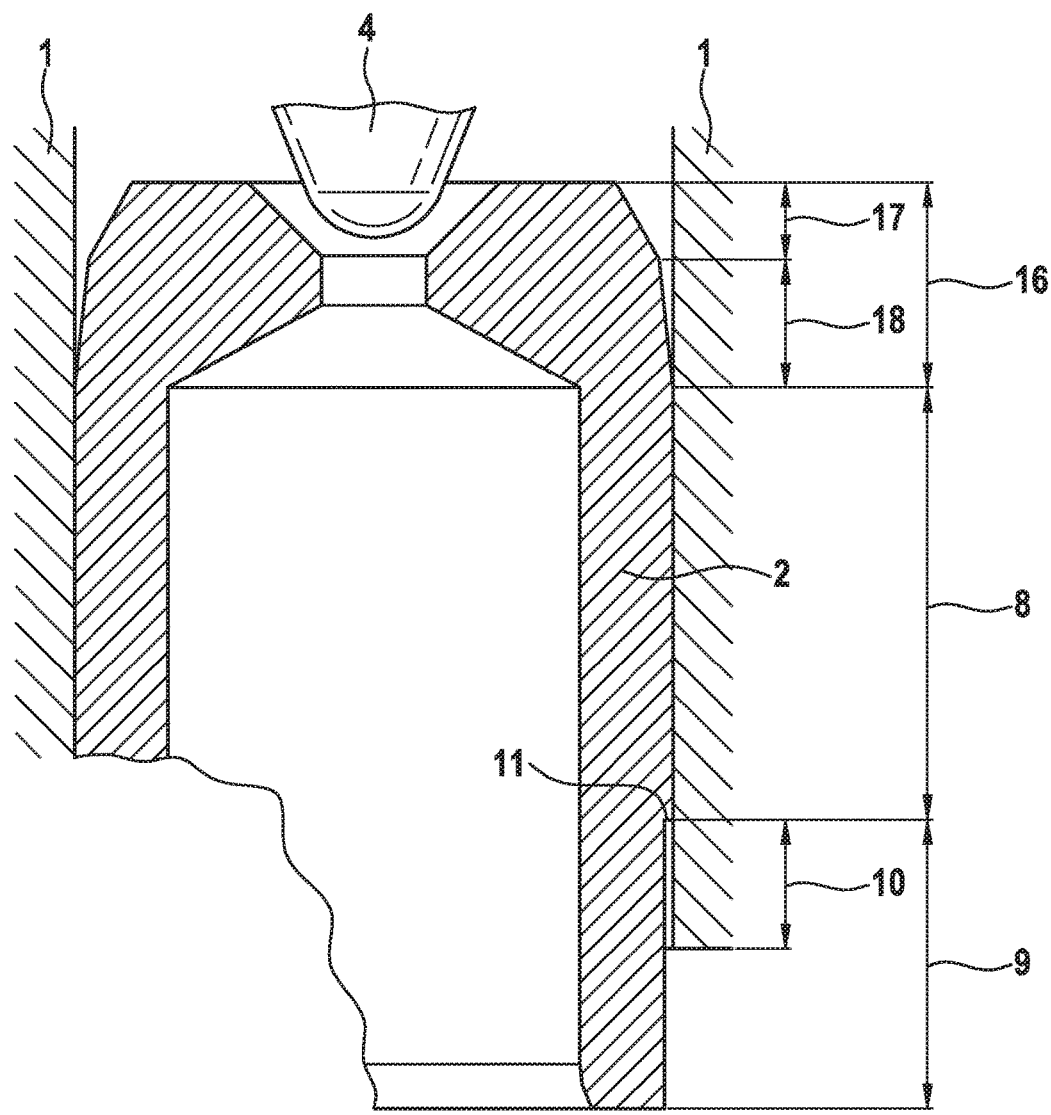
FIG. 2 shows an enlarged representation of the valve seat element in the area of the fastening point in the valve housing.

The valve seat element 2 in the valve housing 1, as shown in the detailed representation according to FIG. 2, may comprise not only a press-fit portion 8 but also a clearance-fit portion 9 along its outer casing, for which purpose the clearance-fit portion 9 has a smaller outside diameter than the press-fit portion 8, and that for secure fixing of the valve seat element 2 the valve housing 1 may comprise a radially inward compressing tubular portion 10, which is provided with a constant inside diameter and which is smaller than the outside diameter of the press-fit portion 8, so that the tubular portion 10, by virtue of its elasticity, compresses into the clearance-fit portion 9 of the valve seat element 2.

As further emerges from FIG. 2, an offset 11 on the outer casing of the valve seat element 2 creates a stepped transition between the press-fit portion 8 and the clearance-fit portion 9, which as a result of the radial compression of the tubular portion 10 into the clearance-fit portion 9 of the valve seat element 2 is enclosed by the tubular portion 10, in such a way that in the valve closing position a downward movement of the valve seat element 2 is reliably prevented under the high hydraulic pressure acting in the area of the valve closing element 4.

The cohesion between the valve seat element 2 and the corresponding inner face of the valve housing 1 is therefore significantly increased in the immediate area of the offset 11, without the risk of a plastic deformation of the thin-walled valve seat element 2.

In an another embodiment of the invention, the offset 11 is provided with a cutting edge, which presses radially into the valve housing 1 and which is also effective for the elastic engagement of the resilient tubular portion 10 in the clearance-fit portion 9 of the valve seat element 2.

The wall thickness of the valve seat element 2 is designed to be greater in the area of the press-fit portion 8 compared to the clearance fit portion 9, so as to permanently exclude the possibility of deforming the valve seat element 2 both during and after the process of pressing into the tubular portion 10.

To allow robotic feeding of the valve seat element 2 during the assembly process, the end portion of the valve seat element 2 facing the valve closing element 4 has a smaller outside diameter than the through-bore 14, adjoining which is a centering portion 16 widening conically in the direction of the press-fit portion 8, so that the valve seat element 2 can easily be inserted with relatively little effort into the fixing portion of the through-bore 14 required for the valve seat fixing.

As can be seen from the embodiment according to FIG. 2, the centering portion 16 is divided into two tapered portions, of which the second tapered portion 18, arranged between the first tapered portion 17 and the press-fit portion 8, has a smaller angle of inclination than the first tapered portion 17, so that owing to the selected graduation of the two angles of inclination the feeding and introduction of the valve seat element 2 into the through-bore 14 proves easier prior to the actual pressing-in operation.

To assemble, the bushing-shaped valve seat element 2 is therefore introduced, at first with an action, by its centering portion 16, from below in the direction of the valve closing element 4, into the through-bore 14 extending into the elastic tubular portion 10, and steadily pressed by its press-fit portion 8 into the relevant fastening portion of the through-bore 14. During the pressing-in operation the tubular portion 10 springs back into the clearance-fit portion 9, in each case below the offset 11, so that a movement in the opposite direction and sliding back of the valve seat element 2 can be very reliably excluded even under extreme stresses.

A hydraulically pressurized annular gap, which is exposed to the hydraulic pressure prevailing in the valve housing 1 at any given time, therefore remains between the clearance-fit portion 9 of the valve seat element 2 and the radially inward compressing tubular portion 10.

For ease of adjustment the depth to which the valve seat element 2 can be pressed into the valve housing 1 is variably adjustable, so that the clearance-fit portion 9 of the valve seat element 2 usually projects to a greater or lesser extent at the radially inward compressing tubular portion 10. Consequently the valve seat element 2 in the area of the clearance-fit portion 9 is only partially covered by the compressing tubular portion 10, without necessarily precluding a full sinking of the slender tubular portion 10 by means of a suitable press-in tool, where desired or where the need arises.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A solenoid valve for motor vehicle brake systems with wheel-slip control comprising:
    a valve closing element axially movable in a valve housing and capable of opening and closing the valve;
    an armature for moving the valve closing element;
    a valve seat element pressed into the valve housing and having a press-fit portion and a clearance-fit portion along an outer casing, wherein the clearance-fit portion has a smaller outside diameter than the press-fit portion, and wherein the valve seat element defines a valve passage;
    a return spring arranged in a through-bore of the valve housing which acts upon the armature;
    a radially inward compressing tubular portion of the valve housing defining a constant inside diameter, smaller than the outside diameter of the press-fit portion, such that the tubular portion compresses into the clearance-fit portion of the valve seat element for secure fixing of the valve seat element to the valve housing; and
    wherein a depth to which the valve seat element can be pressed into the valve housing is variably adjustable, the clearance-fit portion projects at the radially inward compressing tubular portion such that the valve seat element is only partially covered by the compressing tubular portion in the area of the clearance-fit portion.

2. The solenoid valve of claim 1, wherein a stepped transition is defined by an offset on an outer casing of the valve seat element between the press-fit portion and the clearance-fit portion, wherein the stepped transition is enclosed by the tubular portion as a result of the radial compression of the tubular portion into the clearance-fit portion of the valve seat element.

3. The solenoid valve of claim 2, wherein the offset is provided with a cutting edge, which presses radially into the valve housing.

4. The solenoid valve of claim 1, wherein a pressure connection opens into the valve housing on each side of the valve seat element, wherein the pressure connection is a lateral port above the valve seat element and as a vertical port below the valve seat element.

5. The solenoid valve of claim 4, further comprising a ring filter for the valve housing in the area of the lateral port and a plate filter in the area of the vertical port.

6. The solenoid valve of claim 1, wherein the return spring is clamped between an end face of the armature facing the valve housing and an end face of the valve housing.

7. The solenoid valve of claim 1, wherein a bore step is defined by the through-bore, and wherein the return spring is supported on the bore step at an end remote from the armature.

8. The solenoid valve of claim 1, wherein the end portion of the valve seat element facing the valve closing element has a smaller outside diameter than the through-bore, and further comprising a centering portion adjoining the valve seat element, wherein the centering portion widens conically in the direction of the press-fit portion.

9. The solenoid valve of claim 8, wherein the centering portion is divided into two tapered portions, wherein the second tapered portion has a smaller angle of inclination than the first tapered portion and is arranged between the first tapered portion and the press-fit portion.

10. The solenoid valve of claim 1, wherein the valve seat element is a bushing.

11. A solenoid valve for motor vehicle brake systems with wheel-slip control comprising:
   a valve closing element axially movable in a valve housing and capable of opening and closing the valve;
   an armature for moving the valve closing element;
   a valve seat element pressed into the valve housing and having a press-fit portion and a clearance-fit portion along an outer casing, wherein the clearance-fit portion has a smaller outside diameter than the press-fit portion, and wherein the valve seat element defines a valve passage;
   a return spring arranged in a through-bore of the valve housing which acts upon the armature;
   a radially inward compressing tubular portion of the valve housing defining a constant inside diameter, smaller than the outside diameter of the press-fit portion, such that the tubular portion compresses into the clearance-fit portion of the valve seat element for secure fixing of the valve seat element to the valve housing; and
   wherein a hydraulically pressurized annular gap remains between the clearance-fit portion of the valve seat element and the radially inward compressing tubular portion and is exposed to the hydraulic pressure prevailing in the valve housing.

12. The solenoid valve of claim 11, wherein a stepped transition is defined by an offset on an outer casing of the valve seat element between the press-fit portion and the clearance-fit portion, wherein the stepped transition is enclosed by the tubular portion as a result of the radial compression of the tubular portion into the clearance-fit portion of the valve seat element.

13. The solenoid valve of claim 12, wherein the offset is provided with a cutting edge, which presses radially into the valve housing.

14. The solenoid valve of claim 11, wherein the return spring is clamped between an end face of the armature facing the valve housing and an end face of the valve housing.

15. The solenoid valve of claim 11, wherein a bore step is defined by the through-bore, and wherein the return spring is supported on the bore step at an end remote from the armature.

16. The solenoid valve of claim 11, wherein the end portion of the valve seat element facing the valve closing element has a smaller outside diameter than the through-bore, and further comprising a centering portion adjoining the valve seat element, wherein the centering portion widens conically in the direction of the press-fit portion.

17. The solenoid valve of claim 16, wherein the centering portion is divided into two tapered portions, wherein the second tapered portion has a smaller angle of inclination than the first tapered portion and is arranged between the first tapered portion and the press-fit portion.

18. The solenoid valve of claim 11, wherein the valve seat element is a bushing.

* * * * *